United States Patent

Gaenslen

[11] Patent Number: 5,664,754
[45] Date of Patent: Sep. 9, 1997

[54] HANGING DEVICE

[75] Inventor: Gary Gaenslen, Tulsa, Okla.

[73] Assignee: Hilti Aktiengesellschaft, Schaan, Liechtenstein

[21] Appl. No.: 626,386

[22] Filed: Apr. 2, 1996

Related U.S. Application Data

[63] Continuation of Ser. No. 196,335, Feb. 10, 1994, abandoned.

[51] Int. Cl.⁶ ........................................ A47F 5/08
[52] U.S. Cl. .................. 248/317; 248/300; 248/303
[58] Field of Search ........................ 248/320, 317, 248/339, 220.21, 222.52, 224.7, 300, 303, 290.1, 220.41; 211/59.1

[56] References Cited

U.S. PATENT DOCUMENTS

| 354,903 | 12/1886 | Hastings | 248/290.1 X |
|---|---|---|---|
| 725,678 | 4/1903 | Cullum | 248/224.3 X |
| 1,333,600 | 3/1920 | Bell | 248/290.1 |
| 1,732,162 | 10/1929 | Griner | 248/222.2 X |
| 2,459,909 | 1/1949 | Alofs | 248/303 X |
| 2,753,143 | 7/1956 | Berlt | 248/317 |
| 2,917,966 | 12/1959 | Kahn . | |
| 2,952,343 | 9/1960 | Modrey . | |
| 3,000,511 | 9/1961 | Sconzo | 248/300 X |
| 3,055,625 | 9/1962 | Kopf et al. | 248/339 |
| 3,214,127 | 10/1965 | Skidmore et al. . | |
| 3,215,385 | 11/1965 | Rockland | 248/317 |
| 3,480,246 | 11/1969 | Schwartz et al. . | |
| 4,362,249 | 12/1982 | Thalenfeld | 211/59.1 |
| 4,366,906 | 1/1983 | Joyce | 248/290.1 X |
| 4,452,360 | 6/1984 | Barnes | 248/222.2 |
| 4,723,749 | 2/1988 | Carraro et al. . | |
| 4,979,715 | 12/1990 | Rancourt | 248/317 |

FOREIGN PATENT DOCUMENTS

| 666936 | 7/1965 | Belgium . | |
|---|---|---|---|
| 2301650 | 9/1976 | France . | |
| 886236 | 9/1953 | Germany . | |
| 2331906 | 1/1974 | Germany | 248/220.4 |
| 8806310 | 7/1988 | Germany . | |
| 9107956 | 8/1991 | Germany . | |
| 514755 | 10/1971 | Switzerland . | |
| 844892 | 7/1981 | U.S.S.R. | 248/317 |
| 874735 | 8/1961 | United Kingdom . | |

*Primary Examiner*—Leslie A. Braun
*Assistant Examiner*—Stephen S. Wentsler
*Attorney, Agent, or Firm*—Anderson Kill Olick, P.C.

[57] ABSTRACT

A hanging device includes an attachment member (1) and an elongated wire-like support member (7) connectable to the attachment member. The attachment member has an attachment part (2) and a connecting part (3) joined to and extending from the attachment part. The connecting part (3) has at least one pair of slots (5) extending therethrough transversely of the elongated direction of the support member (7). The support member (7) is insertable between a section of the connecting part (3) between the slots and the remaining surface of the connecting part and is deformable to provide a locked connection with the connecting part (3).

4 Claims, 1 Drawing Sheet

HANGING DEVICE

This is a continuation of application Ser. No. 08/196,335, filed Feb. 10, 1994, abandoned.

BACKGROUND OF THE INVENTION

The present invention is directed to a hanging device made up of an attachment member and a wire-like support member. The attachment member has an attachment part for connection to a ceiling or other support surface and a connecting part for securing the support member. The support member is an elongated member and the connecting part extends in the elongated direction of the support member.

Hanging devices of the above type are mainly used to hang various objects, such as tubes, hung ceilings and the like, often from a ceiling. Accordingly, the attachment member of the hanging device is secured to the ceiling and the support member, connected to the attachment member is secured to the object to be suspended. Generally, the support member is a wire or wire-like member.

A hanging device, as described above, is disclosed in U.S. Pat. No. 2,863,149, note FIG. 3. The attachment member has the form of a right angle member. One part of the attachment member is intended to be fastened to a ceiling. The wire support member is connected to the connecting part of the attachment member with the connecting part having a hole through which the support member is passed and twisted.

The connection between the attachment member and the support member is disadvantageous in this known hanging device. Based on the thickness of the support member, passing it through the attachment member and twisting it is relatively cumbersome and requires special tools. If an attempt is made to simplify the device by an appropriate reduction in the thickness of the support member, the load carrying capacity of the device is affected, since the connection between the attachment member and the support member may come apart.

SUMMARY OF THE INVENTION

Therefore, it is the primary object of the present invention to provide a hanging device with an attachment member and a support member wherein a simple and effective connection, capable of carrying the intended load, is provided between the attachment member and the elongated support member.

In accordance with the present invention, a connecting part of the attachment member is provided with at least two slots extending transversely of the elongated direction of the support part. The section of the connecting part located between the slots is displaced perpendicularly from the plane of the connecting surface of the attachment member. The support member is connected to the attachment member by passing it between the displaced section and the remaining connecting surface of the connecting part. As a result, the support member is in abutment with the displaced section and the connecting surface on the opposite sides of the displaced section.

The connection between the attachment member and the support member in the present invention is very simple to fabricate, since slots are only formed by stamping in the connecting part of the attachment member. Due to the formation of the slots a spacing is provided between the section in between the slots and the remaining region of the connecting part with the section between the slots displaced perpendicularly from the plane of the connecting surface of the connecting part. The spacing between the displaced section and the remaining connecting surface corresponds to the thickness of the wire-like support member. It is possible to fix the support member to the attachment member so that it abuts the connecting part on both sides of the displaced region of the connecting part. Accordingly, the advantage is achieved in that the thickness of the support member can be relatively great, since it is unnecessary to twist the support member in connecting it to the attachment member. The thickness of the support member determines the spacing of the displaced region perpendicular to the plane of the connecting surface of the connecting part and such thickness can be selected at random due to the slots.

Preferably, at least four or two pair of slots extending transversely of the elongated direction of the support member are provided affording two sections each located between a different pair of slots. Due to the larger number of slots, the abutment surfaces of the connecting part available for the support member can be increased. With the increased number of slots an improvement in the securement between the support member and the attachment member is effected allowing for increased suspendable loads.

The number of slots with the displaceable section between the slots can be increased randomly in place of the four slots with the two displaceable sections between the slots, so that the dimension of the connecting part extending in the elongated direction of the support member can be increased.

Preferably, the support member is bent at locations between the slots and the remaining planar surface of the connecting part of the attachment member. These bends in the support member matched to the connecting surface of the attachment member creates a positively locked connection between the attachment member and the support member. Therefore, the load to be suspended or hung can be increased.

The formation of the positively locked connection can be accomplished in a simple manner by a second deforming or displacing step where the displacement takes place perpendicularly to the plane of the connecting surface of the connecting part. The deformation or displacement can be achieved by extrusion, pressing, rolling, swaging and the like.

One of the problems experienced in prior art hanging devices relates to shipment and storage of the devices. If the devices are assembled at the manufacturing point they present a shipping and storage problem, since the assembled device is bulky and difficult to package. In the present invention the attachment member and the support member can be shipped separately and afford compact packaging. At the site where the device is to be used, the support member can be inserted into the attachment member and the connecting part deformed, such as by swaging, to provide the lock connection between attachment member and the support member. Accordingly, the present invention affords low shipping and handling costs.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
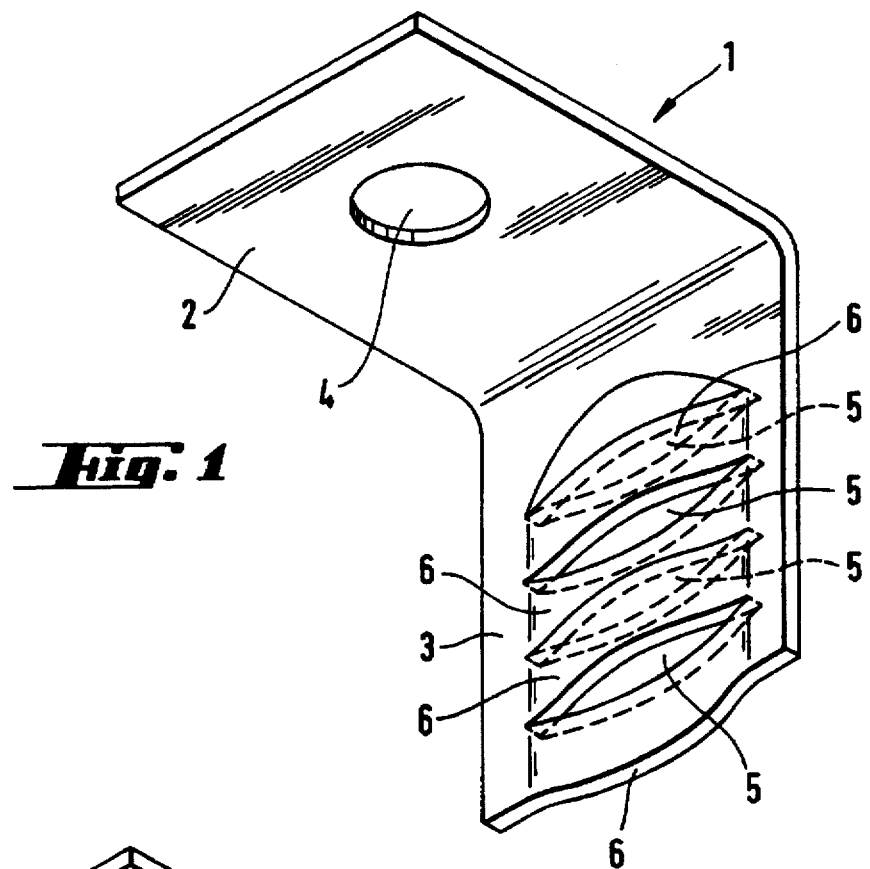
FIG. 1 a perspective view of an attachment member of a hanging device embodying the present invention.

In the FIG. 1 an attachment member 1 of a hanging device is shown made up of an attachment part 2 and a connecting part 3 disposed at a right angle to the attachment part. The attachment part 2 has an opening or hole 4 for receiving a fastening element, such as a nail, screw or the like, for securing the attachment member to a ceiling or other support surface.

Figure 2:
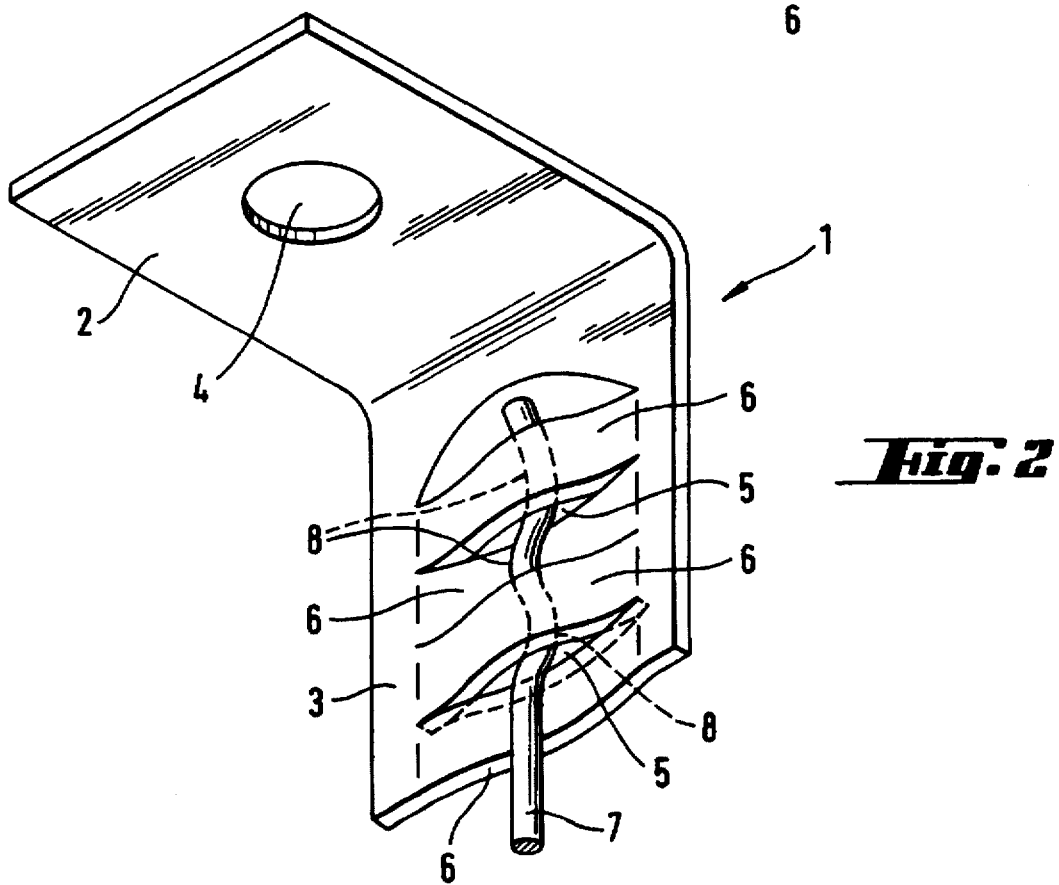
FIG. 2 a perspective view similar to FIG. 1 but showing the support member inserted into and in locked connection with the attachment member.

The connecting part 3 of the attachment member 1 has a plurality of slots 5 extending transversely of the elongated direction of the support member 7, note FIG. 2. Sections 6 of the connecting part 3 located between an adjacent pair of slots 5 are displaced from the planar surface of the connecting part 3 and extend perpendicularly from the plane or surface of the connecting part. The sections 6 can be deformed out of the plane of the remaining surface area of the connecting part 3 by various metal working operations.

In FIG. 2 a complete hanging device is shown with the attachment member 1 corresponding to that in FIG. 1 and a rectilinearly extreme elongated support part 7 secured to the connecting part 3 of the attachment member 1.

As described above, attachment member 1 has a hole or opening 4 extending through attachment part 2 for receiving a fastening element and a connecting part 3 with slots 5 extending transversely of the elongated direction of the support member 7. In FIGS. 1 and 2 two pairs of slots 5 are provided with one section 6 located between each of the pair of slots. Each section 6 is displaced out of the plane of the remaining connecting surface of the connecting part 3 so that openings are provided between the section 6 and the remaining connecting surface of the connecting part 3 for receiving the support part 7.

The support part 7 extends between the sections 6 and the remaining planar surface of the connecting surface of the connecting part 3. As can be seen in FIG. 2, the support part 7 extends between each of the sections 6 and the connecting surface with the upper end of the support member 7 bearing against the connecting surface of the connecting part 3. A positively locked connection between the support member 7 and the connecting part 3 is provided by displacing or deforming the sections 6 in the direction towards the remaining surface of the connecting part 3. As a result of the displacement of the sections 6, bends 8 are formed in the support member 7 for effecting the positively locked connection. As shown in FIG. 2, the bends in the wire-like support part 7 are disposed one following the other in the elongated direction of the support part. The deformation of the sections 6 position the bends 8 in bearing and locking contact with the connecting part 3.

While the attachment member 2 is illustrated as a right angle member, depending on its specific use, the angular arrangement may be varied or the attachment part 2 and the connecting part 3 could be located in the same plane.

The number of pairs of slots 5 and the dimension of the connecting part 3 in the elongated direction of the support member 7 depends on the load to be suspended from the attachment member 1.

While a specific embodiment of the invention has been shown and described in detail to illustrate the inventive principles, it will be understood that the invention may be embodied otherwise without departing from said principles.

I claim:

1. A hanging device comprising an attachment member (1) and an elongated rectilinearly extending wire-like support member (7) having a first and a second end, said attachment member comprises an attachment part (2) having a surface to be attached to a support surface and a connecting part (3) extending from said attachment part and having a planar connecting surface separate from said surface of said attachment part (2) and extending in an elongated direction of said support member (7), said planar connecting surface of said connecting part having a pair of laterally spaced edges extending in the elongated direction and a first end and a second end extending transversely of and at opposite ends of said edges, said connecting part (3) having at least a pair of slots (5) extending therethrough transversely of the elongated direction of said support member and terminating inwardly of said edges, a section (6) of said connecting part (3) located between at least a pair of said slots (5) and having opposite ends spaced apart and said section extending transversely of the elongated direction and connected at each of said ends to said connecting surface, said section (6) being is displaced perpendicularly out of said planar connecting surface, said support member (7) is inserted in the elongated direction between and in contact with said connection surface and a surface of said displaceable section (6) facing towards said connecting surface so that said first end thereof extends rectilinearly towards said first end of said connecting surface and said second end thereof extends rectilinearly beyond the second end of said connecting surface and said support member including bends extending transversely of said displaceable section and being formed by said displaceable section (6) when said displaceable section (6) is displaced towards said connecting surface and said bends cooperating with said displaceable section (6) for providing a locked connection between said support member and said connecting part (3) with said support member (7) extending rectilinearly from the locked connection and generally parallel with said connecting surface.

2. A hanging device, as set forth in claim 1, wherein at least two pair of said slots (5) are formed in said connecting part (3) extending transversely of the elongated direction of said support member (7) with each said pair of slots spaced apart in the elongated direction of said support member whereby at least two said displaceable sections (6) are formed in said connecting part (3) with said support member positioned between said at least two displaceable sections and said connecting surface of said connecting part and forming bends when said sections are displaced.

3. A hanging device, as set forth in claim 1, wherein said attachment member (1) has said attachment part (2) extending substantially perpendicularly to said connecting part (3).

4. A hanging device, as set forth in claim 3, wherein said support member (7) comprises a round wire.

* * * * *